United States Patent
Wang et al.

(10) Patent No.: US 11,659,181 B2
(45) Date of Patent: May 23, 2023

(54) METHOD AND APPARATUS FOR DETERMINING REGION OF INTEREST

(71) Applicant: BEIJING BAIDU NETCOM SCIENCE AND TECHNOLOGY CO., LTD., Beijing (CN)

(72) Inventors: Xiaoming Wang, Beijing (CN); Huaifei Xing, Beijing (CN); Wenpeng Ding, Beijing (CN); Huifeng Shen, Beijing (CN); Feifei Cao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 279 days.

(21) Appl. No.: 16/892,910

(22) Filed: Jun. 4, 2020

(65) Prior Publication Data
US 2021/0192217 A1 Jun. 24, 2021

(30) Foreign Application Priority Data
Dec. 19, 2019 (CN) .......................... 201911314000.8

(51) Int. Cl.
*G06K 9/00* (2022.01)
*H04N 19/124* (2014.01)
(Continued)

(52) U.S. Cl.
CPC ........... *H04N 19/124* (2014.11); *G06F 18/22* (2023.01); *G06T 7/70* (2017.01); *G06V 10/22* (2022.01);
(Continued)

(58) Field of Classification Search
CPC ...... G06K 9/62; G06K 9/6201; G06K 9/6267; G06K 9/6288; G06K 9/6292;
(Continued)

(56) References Cited

U.S. PATENT DOCUMENTS 9,118,912 B2 * 8/2015 Bhagavathy ......... H04N 19/103
10,319,115 B2 * 6/2019 Park .......................... G06T 7/11
(Continued)

FOREIGN PATENT DOCUMENTS

| CN | 103974071 A | 8/2014 |
| CN | 104427337 A | 3/2015 |

(Continued)

OTHER PUBLICATIONS

Chinese Office Action for Chinese Application No. 201911314000.8, dated May 20, 2022, 9 pages.

Primary Examiner — Eric Rush
(74) Attorney, Agent, or Firm — Seed IP Law Group LLP

(57) ABSTRACT

Embodiments of the present disclosure relate to a method and apparatus for processing a video. The method may include: acquiring object regions obtained by performing object detection on a target video frame, a type of an object in each of the object regions being a preset type; determining, for an object region in the acquired object regions, in response to determining that the object region satisfies a preset condition, that the object region is a non-ROI; using an object region other than the non-ROI in the object regions of the target video frame as a ROI; and acquiring a quantization parameter change corresponding to each ROI, and encoding the target video frame based on the quantization parameter change.

19 Claims, 8 Drawing Sheets

(51) Int. Cl.
*G06T 7/70* (2017.01)
*G06V 20/40* (2022.01)
*G06V 10/25* (2022.01)
*G06V 40/10* (2022.01)
*G06F 18/22* (2023.01)
*G06V 10/80* (2022.01)
*H04N 19/102* (2014.01)
*H04N 19/167* (2014.01)
*G06V 10/22* (2022.01)
*G06V 10/764* (2022.01)
*H04N 19/169* (2014.01)
*H04N 19/115* (2014.01)
*G06V 10/28* (2022.01)
*H04N 19/17* (2014.01)

(52) U.S. Cl.
CPC .............. *G06V 10/25* (2022.01); *G06V 10/28* (2022.01); *G06V 10/764* (2022.01); *G06V 10/811* (2022.01); *G06V 20/41* (2022.01); *G06V 40/10* (2022.01); *H04N 19/102* (2014.11); *H04N 19/115* (2014.11); *H04N 19/167* (2014.11); *H04N 19/169* (2014.11); *H04N 19/17* (2014.11); *G06T 2207/10016* (2013.01)

(58) Field of Classification Search
CPC ........... G06K 9/6293; G06T 7/10; G06T 7/11; G06T 7/70; G06T 9/00; G06T 9/005; G06T 9/008; G06T 2207/10016; G06T 2207/20012; G06T 2207/20021; G06T 2207/30176; G06T 2207/30196; G06T 2207/30201; G06V 10/22; G06V 10/25; G06V 10/28; G06V 10/70; G06V 10/74; G06V 10/764; G06V 10/803; G06V 10/809; G06V 10/811; G06V 20/40; G06V 20/41; G06V 20/60; G06V 20/62; G06V 20/64; G06V 40/10; G06V 40/16; G06V 40/161; H04N 19/102; H04N 19/115; H04N 19/122; H04N 19/124; H04N 19/126; H04N 19/13; H04N 19/134; H04N 19/14; H04N 19/146; H04N 19/157; H04N 19/167; H04N 19/169; H04N 19/17; H04N 19/172; H04N 19/176; H04N 19/196; H04N 19/197; H04N 19/198; H04N 19/20; H04N 19/23; H04N 19/29; H04N 19/30; H04N 19/33; H04N 19/37; G06F 18/22; G06F 18/256

USPC ........ 382/100, 103, 115, 117, 118, 164, 165, 382/170, 171, 173, 176, 181, 195, 196, 382/198, 203, 209, 217, 224–226, 232, 382/234, 236, 238, 239, 243, 246, 248, 382/251–253, 275, 282, 283, 291, 292, 382/325; 375/240, 240.01, 240.02, 375/240.03, 240.08, 240.22, 240.23, 375/240.26; 348/14.12, 14.13, 27, 77, 348/135, 169, 384.1, 387.1, 390.1, 397.1, 348/399.1, 403.1, 404.1, 405.1, 408.1, 348/414.1, 417.1, 418.1, 420.1, 421.1, 348/422.1, 425.1, 440.1, 607, 608, 610; 358/426.01, 426.02, 426.03, 426.04, 358/426.07, 449, 462, 464

See application file for complete search history.

(56) References Cited

U.S. PATENT DOCUMENTS

| | | | |
|---|---|---|---|
| 11,490,092 B2* | 11/2022 | Zhao | H04N 19/137 |
| 2009/0087027 A1* | 4/2009 | Eaton | G06F 15/16 |
| | | | 382/103 |
| 2009/0263021 A1* | 10/2009 | Takamori | G06V 20/52 |
| | | | 382/181 |
| 2011/0235706 A1* | 9/2011 | Demircin | H04N 19/126 |
| | | | 375/240.03 |
| 2013/0195178 A1* | 8/2013 | Price | H04N 19/115 |
| | | | 375/E7.076 |
| 2013/0208784 A1* | 8/2013 | Pietila | G06V 40/162 |
| | | | 382/165 |
| 2013/0342640 A1* | 12/2013 | Li | H04N 19/115 |
| | | | 348/14.13 |
| 2019/0068968 A1 | 2/2019 | Jun et al. | |
| 2020/0137369 A1* | 4/2020 | Yuan | G06T 7/521 |
| 2020/0413070 A1* | 12/2020 | Huang | H04N 19/167 |
| 2021/0409729 A1* | 12/2021 | Gao | H04N 19/167 |

FOREIGN PATENT DOCUMENTS

| | | |
|---|---|---|
| CN | 105744271 A | 7/2016 |
| CN | 106488241 A | 3/2017 |
| CN | 109429063 A | 3/2019 |
| CN | 109698957 A | 4/2019 |
| CN | 110049324 A | 7/2019 |
| JP | 2002247375 A | 8/2002 |

* cited by examiner

METHOD AND APPARATUS FOR DETERMINING REGION OF INTEREST

CROSS-REFERENCE TO RELATED APPLICATIONS

This application claims priority to Chinese Application No. 201911314000.8, filed on Dec. 19, 2019 and entitled "Method and Apparatus for Processing Video," the entire disclosure of which is hereby incorporated by reference.

TECHNICAL FIELD

Embodiments of the present disclosure relate to the field of computer technology, specifically to the field of Internet technology, and more specifically to a method and apparatus for processing a video.

BACKGROUND

In a video frame, ROI (region of interest) refers to a region of interest. In the general study of ROI, a method for detecting image distinctiveness is used to perform division of ROI regions.

Image distinctiveness is a relatively subjective concept. In some scenarios, the performance of image distinctiveness detection is not stable, and the detection accuracy is limited. In a general target detection method, when there are a plurality of targets in a screen and there are a plurality of types of the targets, it is difficult to accurately determine which regions belong to the ROI.

SUMMARY

Embodiments of the present disclosure propose a method and apparatus for processing a video.

In a first aspect, an embodiment of the present disclosure provides a method for processing a video, including: acquiring object regions obtained by performing object detection on a target video frame, a type of an object in each of the object regions being a preset type; determining, for an object region in the acquired object regions, in response to determining that the object region satisfies a preset condition, that the object region is a non-ROI (region of interest); using an object region other than the non-ROI in the object regions of the target video frame as a ROI; and acquiring a quantization parameter change corresponding to each ROI, and encoding the target video frame based on the quantization parameter change.

In some embodiments, the acquiring the quantization parameter change corresponding to each ROI, includes: determining, for each ROI in the target video frame, the quantization parameter change corresponding to the ROI based on a type of an object in the ROI, the type of the object being one of at least one preset type.

In some embodiments, the determining, for the object region in the acquired object regions, in response to determining that the object region satisfies the preset condition, that the object region is the non-ROI, includes: determining, for the object region in the acquired object regions, whether a ratio of the object region to the target video frame is greater than a preset ratio; and determining that the object region is the non-ROI in response to determining that the ratio of the object region to the target video frame is greater than the preset ratio.

In some embodiments, the determining that the object region is the non-ROI in response to determining that the ratio of the object region to the target video frame is greater than the preset ratio, includes: determining, in response to determining that the ratio of the object region to the target video frame is greater than the preset ratio and the type of the object in the object region is a preset type with a highest priority, that the object regions in the target video frame are non-ROIs, the priority being used to represent a priority for determining each type of object region as the ROI.

In some embodiments, for object regions of a same type, an object region having larger area has a higher priority, and the priority is used to represent a priority for determining each type of object region as the ROI.

In some embodiments, for object regions respectively containing a head and a body of a same person, in response to determining that a ratio of the object region containing the head to the target video frame is greater than a specified threshold, the object region containing the head has a priority higher than a priority of the object region containing the body, or in response to determining that the ratio of the object region containing the head to the target video frame is not greater than the specified threshold, the object region containing the body has a priority higher than a priority of the object region containing the head, both types of the head and the body are preset types.

In some embodiments, the determining, for the object region in the acquired object regions, in response to determining that the object region satisfies the preset condition, that the object region is the non-ROI, includes: matching two object regions respectively containing a head and a body of a same person in the object regions as an associated region group, based on a positional relationship between the object regions and types of objects in the object regions; and determining, for an associated region group, in response to determining that a ratio of a head in an object region of a head type in the associated region group to the target video frame exceeds a specified threshold, that another object region of the associated region group is the non-ROI, or in response to determining that the ratio of the head in the object region of the head type to the target video frame does not exceed the specified threshold, that the object region of the head type is the non-ROI.

In some embodiments, the determining, for the object region in the acquired object regions, in response to determining that the object region satisfies the preset condition, that the object region is the non-ROI, includes: determining, for the object region in the acquired object regions, a priority of the object region based on the type of the object region; and determining, in response to determining that the object region satisfies the preset condition based on the priority of the object region, that the object region is the non-ROI.

In some embodiments, the determining, in response to determining that the object region satisfies the preset condition based on the priority of the object region, that the object region is the non-ROI, includes: selecting, for the object regions, a preset number of object regions according to priorities of the object regions in a descending order; and using an object region other than the selected object regions as the non-ROI, in response to determining that ratios of the selected object regions in the object regions to the target video frame do not exceed a preset ratio.

In some embodiments, both a head type and a body type belong to a human body category; and the determining, for the object region in the acquired object regions, in response to determining that the object region satisfies the preset condition, that the object region is the non-ROI, includes: acquiring, in response to the target video frame containing an object region of the human body category and an object region of a text type, a target quantization parameter change corresponding to each object region of the human body category in the target video frame, wherein the target quantization parameter change is determined based on a preset constant and a specified constant coefficient, and different preset types correspond to different preset constants; predicting, for each object region of the human body category in the target video frame, based on the target quantization parameter change corresponding to the object region and a ratio of the object region to the target video frame, an increase ratio of the object region relative to an object region obtained by encoding based on a specified quantization parameter of an encoder, and determining a sum of increase ratios of code rates of the object regions of the human body category; and determining, in response to the sum of the increase ratios exceeding a preset increase ratio threshold of the target video frame, that each object region of the text type in the target video frame is the non-ROI.

In some embodiments the determining, for each ROI in the target video frame, the quantization parameter change corresponding to the ROI based on the type of the object in the ROI, includes: acquiring a maximum value of a sum of increase ratios of code rates of types of ROIs in the target video frame, wherein the maximum value of the sum of the increase ratios of the code rates is obtained relative to types of ROIs obtained by encoding based on a specified quantization parameter of an encoder; acquiring a preset constant corresponding to the type of the object in the ROI, wherein different preset types correspond to different preset constants, and the quantization parameter change is determined based on the preset constant and a constant coefficient; and determining quantization parameter change corresponding to each type of ROI in the target video frame based on the maximum value of the sum of the increase ratios of the code rates, the preset constant corresponding to each type of ROI, and the ratio of each type of ROI to the target video frame.

In some embodiments, the acquiring object regions obtained by performing object detection on the target video frame, includes: acquiring a video frame sequence of a video; determining a previous frame in the video frame sequence, and determining a subsequent frame, in the video frame sequence, corresponding to the determined previous frame, based on acquired number of frames elapsed from the previous frame to the subsequent frame; performing following update steps: acquiring object regions detected separately in the determined previous frame and the subsequent frame, and a confidence of each of the object regions; determining, from the determined object region of the previous frame and the determined object region of the subsequent frame, a first object region and a second object region including a same object; and fusing a confidence of the first object region and a confidence of the second object region, and updating the confidence of the second object region based on a result of the fusion; and the method further includes: determining, from object regions with updated confidences in the determined subsequent frame, an object region having a confidence less than a confidence threshold; and determining the object region having the confidence less than the confidence threshold as a non-object region.

In some embodiments, the update steps further include: updating the determined previous frame and the subsequent frame, wherein the updated previous frame is the subsequent frame before the update; and the method further includes: performing the update steps again, in response to determining that the subsequent frame before the update is not a last frame in the video frame sequence.

In a second aspect, an embodiment of the present disclosure provides an apparatus for processing a video, including: an acquisition unit, configured to acquire object regions obtained by performing object detection on a target video frame, a type of an object in each of the object regions being a preset type; a determination unit, configured to determine, for an object region in the acquired object regions, in response to determining that the object region satisfies a preset condition, that the object region is a non-ROI (region of interest); a region of interest determining unit, configured to use an object region other than the non-ROI in the object regions of the target video frame as a ROI; and an encoding unit, configured to acquire a quantization parameter change corresponding to each ROI, and encode the target video frame based on the quantization parameter change.

In some embodiments, the encoding unit is further configured to acquire the quantization parameter change corresponding to each ROI by: determining, for each ROI in the target video frame, the quantization parameter change corresponding to the ROI based on a type of an object in the ROI, the type of the object being one of at least one preset type.

In some embodiments, the determination unit is further configured to determine, for the object region in the acquired object regions, in response to determining that the object region satisfies the preset condition, that the object region the a non-ROI by: determining, for the object region in the acquired object regions, whether a ratio of the object region to the target video frame is greater than a preset ratio; and determining that the object region is the non-ROI in response to determining that the ratio of the object region to the target video frame is greater than the preset ratio.

In some embodiments, the determination unit is further configured to determine that the object region is the non-ROI in response to determining that the ratio of the object region to the target video frame is greater than the preset ratio by: determining, in response to determining that the ratio of the object region to the target video frame is greater than the preset ratio and the type of the object in the object region is a preset type with a highest priority, that the object regions in the target video frame are non-ROIs, the priority being used to represent a priority for determining each type of object region as the ROI.

In some embodiments, for object regions of a same type, an object region having larger area has a higher priority, and the priority is used to represent a priority for determining each type of object region as the ROI.

In some embodiments, for object regions respectively containing a head and a body of a same person, in response to determining that the ratio of the object region containing the head to the target video frame is greater than a specified threshold, the object region containing the head has a priority higher than a priority of the object region containing the body, or in response to determining that the ratio of the object region containing the head to the target video frame is not greater than the specified threshold, the object region containing the body has a priority higher than a priority of the object region containing the head, both types of the head and the body are preset types.

In some embodiments, the determination unit is further configured to determine, for the object region in the acquired object regions, in response to determining that the object region satisfies the preset condition, that the object region is the non-ROI by: matching two object regions respectively containing a head and a body of a same person in the object regions as an associated region group, based on a positional relationship between the object regions and types of objects in the object regions; and determining, for an associated region group, in response to determining that a ratio of a head in an object region of a head type in the associated region group to the target video frame exceeds a specified threshold, that another object region of the associated region group is the non-ROI, or in response to determining that the ratio of the head in the object region of the head type to the target video frame does not exceed the specified threshold, that the object region of the head type is the non-ROI.

In some embodiments, the determination unit is further configured to determine, for the object region in the acquired object regions, in response to determining that the object region satisfies the preset condition, that the object region is the non-ROI by: determining, for the object region in the acquired object regions, a priority of the object region based on the type of the object region; and determining, in response to determining that the object region satisfies the preset condition based on the priority of the object region, that the object region is the non-ROI.

In some embodiments, the determination unit is further configured to determine, in response to determining that the object region satisfies the preset condition based on the priority of the object region, that the object region is the non-ROI by: selecting, for the object regions, a preset number of object regions according to priorities of the object regions in a descending order; and using an object region other than the selected object regions as the non-ROI, in response to determining that ratios of the selected object regions in the object regions to the target video frame do not exceed a preset ratio.

In some embodiments, both a head type and a body type belong to a human body category; and the determination unit is further configured to determine, for the object region in the acquired object regions, in response to determining that the object region satisfies the preset condition, that the object region is the non-ROI by: acquiring, in response to the target video frame containing an object region of the human body category and an object region of a text type, a target quantization parameter change corresponding to each object region of the human body category in the target video frame, where the target quantization parameter change is determined based on a preset constant and a specified constant coefficient, and different preset types correspond to different preset constants; predicting, for each object region of the human body category in the target video frame, based on the target quantization parameter change corresponding to the object region and a ratio of the object region to the target video frame, an increase ratio of the object region relative to an object region obtained by encoding based on a specified quantization parameter of an encoder, and determining a sum of increase ratios of code rates of the object regions of the human body category; and determining, in response to the sum of the increase ratios exceeding a preset increase ratio threshold of the target video frame, that each object region of the text type in the target video frame is the non-ROI.

In some embodiments, the encoding unit is further configured to determine, for each ROI in the target video frame, the quantization parameter change corresponding to the ROI based on the type of the object in the ROI by: acquiring a maximum value of a sum of increase ratios of code rates of types of ROIs in the target video frame, where the maximum value of the sum of the increase ratios of the code rates is obtained relative to types of ROIs obtained by encoding based on a specified quantization parameter of an encoder; acquiring a preset constant corresponding to the type of the object in the ROI, where different preset types correspond to different preset constants, and the quantization parameter change is determined based on a preset constant and a constant coefficient; and determining quantization parameter change corresponding to each type of ROI in the target video frame based on the maximum value of the sum of the increase ratios of the code rates, the preset constant corresponding to each type of ROI, and the ratio of each type of ROI to the target video frame.

In some embodiments, the acquisition unit is further configured to acquire object regions obtained by performing object detection on the target video frame by: acquiring a video frame sequence of a video; determining a previous frame in the video frame sequence, and determining a subsequent frame, in the video frame sequence, corresponding to the determined previous frame, based on acquired number of frames elapsed from the previous frame to the subsequent frame; performing the following update steps: acquiring object regions detected separately in the determined previous frame and the subsequent frame, and a confidence of each of the object regions; determining, from the determined object region of the previous frame and the determined object region of the subsequent frame, a first object region and a second object region including a same object; fusing a confidence of the first object region and a confidence of the second object region, and updating the confidence of the second object region based on a result of the fusion; determining, from object regions with updated confidences in the determined subsequent frame, an object region having a confidence less than a confidence threshold; and determining the object region having the confidence less than the confidence threshold as a non-object region.

In some embodiments, the update steps further include: updating the determined previous frame and the subsequent frame, where the updated previous frame is the subsequent frame before the update; and the apparatus further includes: an update unit, configured to perform the update steps again, in response to determining that the subsequent frame before the update is not the last frame in the video frame sequence.

In a third aspect, an embodiment of the present disclosure provides an electronic device, the device electronic including: one or more processors; and a storage apparatus, for storing one or more programs, where the one or more programs, when executed by the one or more processors, cause the one or more processors to implement any embodiment of the method for processing a video.

In a fourth aspect, an embodiment of the present disclosure provides a computer readable storage medium, storing a computer program thereon, where the computer program, when executed by a processor, implements any embodiment of the method for processing a video.

The video processing solution provided by embodiments of the present disclosure, first, acquires object regions obtained by performing object detection on a target video frame, a type of an object in each of the object regions being a preset type; then determines, for an object region in the acquired object regions, in response to determining that the object region satisfies a preset condition, that the object region is a non-ROI; uses an object region other than the non-ROI in the object regions of the target video frame as a ROI; after that, uses an object region other than the non-ROI in the object regions of the target video frame as a ROI; and finally acquires a quantization parameter change corresponding to each ROI, and encodes the target video frame based on the quantization parameter change. Embodiments of the present disclosure may acquire the quantization parameter change corresponding to a ROI for the ROI, so that ROI in a target video frame may be differently encoded from other regions. In this way, it is possible to perform quality adjustment only on the ROI, thereby saving computing resources. In addition, in embodiments of the present disclosure, instead of selecting an individual object region from the object regions as a ROI, a preset condition is used to determine non-ROIs, and all object regions except for the non-ROIs are used as the ROI, so that the ROI may be determined more comprehensively, and the recall rate for determining a ROI may be improved.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
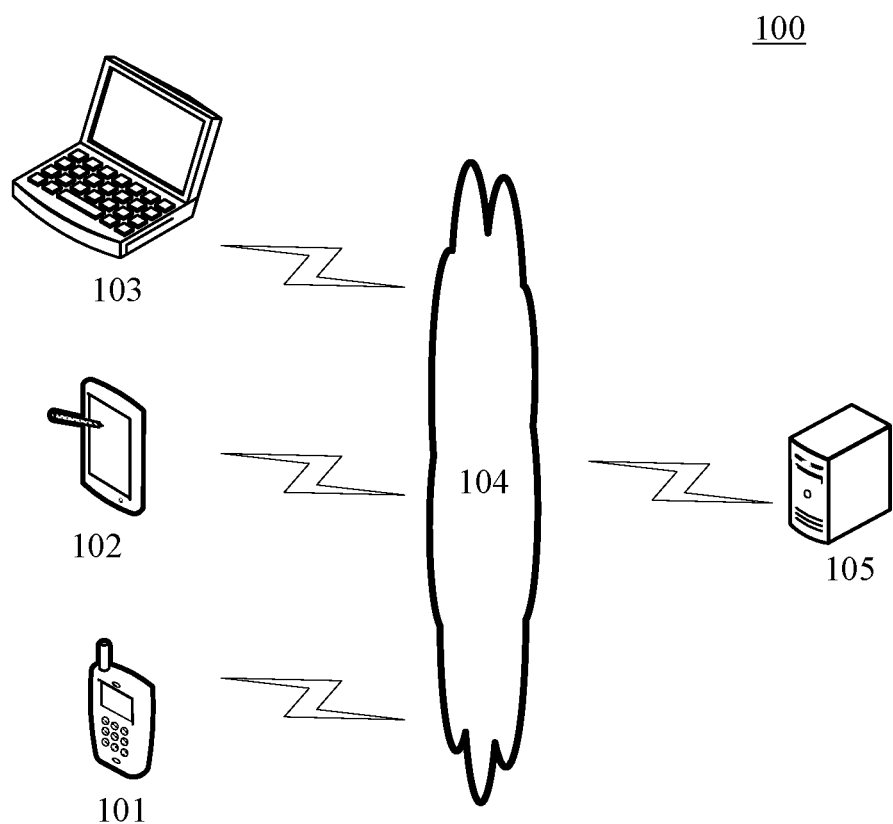
FIG. 1 is a diagram of an example system architecture in which some embodiments of the present disclosure may be implemented.

FIG. 1 illustrates an example system architecture 100 in which a method for processing a video or an apparatus for processing a video of embodiments of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optic fibers.

A user may interact with the server 105 through the network 104 using the terminal devices 101, 102, 103, to receive or send messages or the like. Various communication client applications, such as video applications, live broadcast applications, instant messaging tools, email clients, or social platform software, may be installed on the terminal devices 101, 102, and 103.

The terminal devices 101, 102, and 103 may be hardware or software. When the terminal devices 101, 102, and 103 are hardware, the terminal devices 101, 102, and 103 may be various electronic devices having a display screen, including but not limited to smart phones, tablet computers, E-book readers, laptop portable computers, desktop computers, or the like. When the terminal devices 101, 102, and 103 are software, the terminal devices 101, 102, and 103 may be installed in the electronic devices listed above. The terminal devices 101, 102, and 103 may be implemented as a plurality of software or software modules (such as a plurality of software or software modules used to provide distributed services), or as a single software or software module, which is not specifically limited herein.

The server 105 may be a server that provides various services, such as a backend server that provides support to the terminal devices 101, 102, and 103. The backend server may perform analysis and other processing on a received target video frame and other data, and feed back a processing result (for example, the result of encoding the target video frame) to the terminal device.

It should be noted that the method for processing a video provided by embodiments of the present disclosure may be executed by the server 105 or the terminal devices 101, 102, 103. Correspondingly, the apparatus for processing a video may be provided in the server 105 or the terminal devices 101, 102, 103, which is not specifically limited herein.

It should be understood that the numbers of terminal devices, networks, and servers in FIG. 1 are merely illustrative. Depending on the implementation needs, any number of terminal devices, networks, and servers may be provided.

Figure 2:
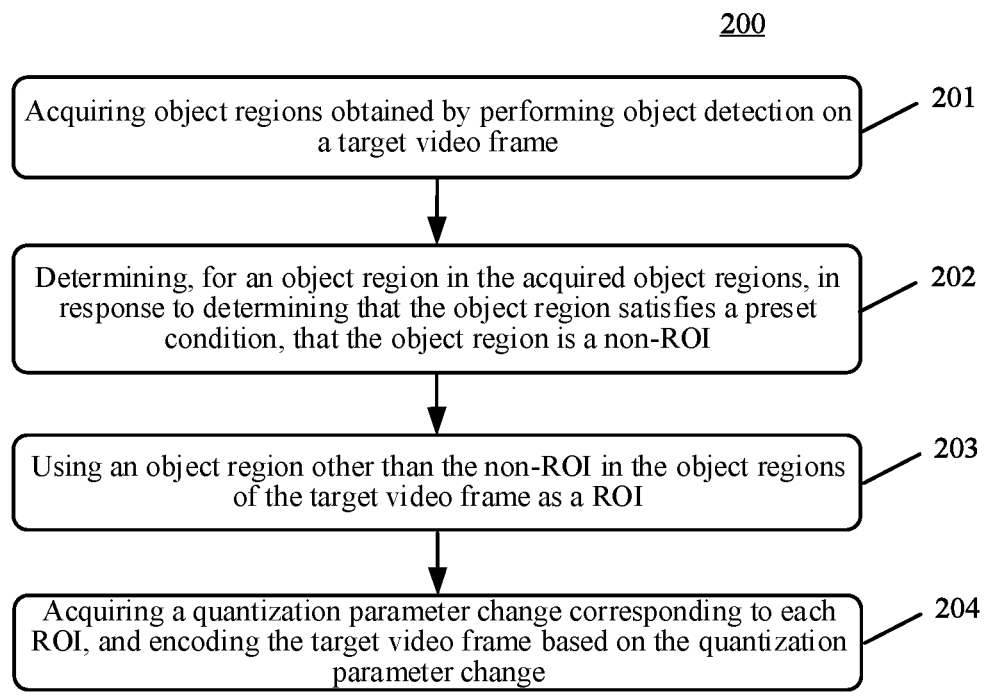
FIG. 2 is a flowchart of a method for processing a video according to an embodiment of the present disclosure.

With further reference to FIG. 2, a flow 200 of a method for processing a video according to an embodiment of the present disclosure is illustrated. The method for processing a video includes the following steps.

Step 201, acquiring object regions obtained by performing object detection on a target video frame, a type of an object in each of the object regions being a preset type.

In the present embodiment, an executing body of the method for processing a video (for example, the server or the terminal device shown in FIG. 1) may acquire the object regions obtained by performing object detection on the target video frame. Specifically, the obtained object region may refer to the position of the object region in the target video frame, or may refer to a region image matrix where the object region is located in the target video frame.

The types of the objects in the object regions are preset types, that is, these objects belong to preset type objects. For example, the preset type may be a face type or a head type, and may also be a body type, a text type, etc. An object region obtained by detection corresponds to and indicates an object. The object region here may be all object regions detected in the target video frame, or part of the detected object regions.

In practice, the executing body may acquire the object region using various methods. For example, the executing body may directly acquire a detection result of detecting the target video frame, that is, the object region, locally or from another electronic device. In addition, the executing body may also perform object detection on the target video frame to acquire object regions where at least one object of a preset type in the target video frame is respectively located.

In some alternative implementations of the present embodiment, for object regions of the same type, an object region having larger area has higher priority, and the priority is used to represent a priority for determining each type of object region as the ROI.

In these alternative implementations, when comparing object regions of the same type, the object region having larger area has higher priority. Object regions of different preset types have different priorities. The priority here may be the priority for determining an object region as the ROI.

These implementations may quickly and accurately determine the priority based on the area, so as to more accurately determining whether the object region is the ROI.

In some alternative implementations of the present embodiment, for object regions respectively containing a head and a body of a same person, if the ratio of the object region containing the head to the target video frame is greater than a specified threshold, then the object region containing the head has a priority higher than a priority of the object region containing the body. Or if the ratio of the object region containing the head to the target video frame is not greater than the specified threshold, then the object region containing the body has a priority higher than a priority of the object region containing the head. Both types of the head and the body are preset types.

In these alternative implementations, the object region having larger area has higher priority. For the head and the body of the same person, when the ratio of the head area is greater than a preset first ratio, then the object region where the body is located is regarded as a non-ROI, and the object region where the head is located is regarded as a ROI. If the area of the head is relatively small, then the object region where the head is located is regarded as the non-ROI, and the object region where the body is located is regarded as the ROI. In addition, the priorities of the object regions where characters are located may be the same.

These implementations may more accurately determine whether an object region is a ROI based on the priority.

Step 202, determining, for an object region in the acquired object regions, in response to determining that the object region satisfies a preset condition, that the object region is a non-ROI.

In the present embodiment, the executing body may determine, for the object region (such as each object region) in the acquired object region, whether the object region is the non-ROI. The non-ROI may refer to an object region that is not a ROI.

In practice, the preset condition may be various conditions. For example, the preset condition may be that the object in the object region is an object of a first preset type. For example, the object of the first preset type may be an object of the head type. In addition, the preset condition may also be that the brightness of pixels in the object region is less than a preset threshold.

Step 203, using an object region other than the non-ROI in the object regions of the target video frame as a ROI.

In the present embodiment, after determining the non-ROI, the executing body may directly determine the object region other than the non-ROI in the acquired object regions as the ROI.

Step 204, acquiring a quantization parameter change corresponding to each ROI, and encoding the target video frame based on the quantization parameter change.

In the present embodiment, the executing body may acquire the quantization parameter change corresponding to each ROI. Then, the executing body may use the acquired quantization parameter change to encode. The executing body may directly acquire the quantization parameter change of the object in each ROI locally or from another electronic device, or may determine the quantization parameter change locally. The quantization parameter is the serial number of the quantization step. For encoding, the quantization step has a total of 52 values, and the quantization parameter may take a value from 0-51.

In practice, an encoder has a specified quantization parameter for the target video frame without inputting the quantization parameter change. The specified quantization parameters corresponding to different regions may be different. In the present disclosure, the quantization parameter change refers to the change relative to the quantization parameter specified by the encoder. When the quantization parameter change corresponding to the object region is a positive number, the picture quality of the encoded object region decreases, and when the quantization parameter change corresponding to the object region is a negative number, the picture quality of the encoded object region improves.

For example, the specified quantization parameter that the encoder encodes for a ROI is X. In order to improve the picture quality of the ROI, the executing body sets a new quantization parameter as Y, where Y<X, then the quantization parameter change of the ROI is Y−X, which is a negative number.

In practice, the quantization parameter change is a parameter that may be inputted during the encoding process and may change the encoding process of the encoder. The executing body may pass the region image matrix of the object region and the quantization parameter change to the encoder through an interface provided by the encoder. In this way, the executing body may encode the target video frame at the encoder. In the target video frame, the ROI is encoded based on the quantization parameter change, and regions other than the ROI are encoded based on specified quantization parameters. Specifically, the picture quality of the ROI after encoding may be higher than the picture quality after encoding using the specified quantization parameter.

The present embodiment may acquire the quantization parameter change corresponding to the ROI for the ROI, so that ROI in a target video frame may be differently encoded from other regions. In this way, it is possible to perform quality adjustment only on the ROI, thereby saving computing resources. In addition, in the present embodiment, instead of selecting an individual object region from the object regions as a ROI, a preset condition is used to determine non-ROIs, and all object regions except for the non-ROIs are used as the ROIs, so that the ROI may be determined more comprehensively, and the recall rate for determining a ROI may be improved.

In some alternative implementations of the present embodiment, both the head type and the body type belong to a human body category; and step 202 may include: acquiring, in response to the target video frame containing an object region of the human body category and an object region of a text type, a target quantization parameter change corresponding to each object region of the human body category in the target video frame, where the target quantization parameter change is determined based on a preset constant and a specified constant coefficient, and different preset types correspond to different preset constants; predicting, for each object region of the human body category in the target video frame, based on the target quantization parameter change corresponding to the object region and a ratio of the object region to the target video frame, an increase ratio of the object region relative to an object region obtained by encoding based on a specified quantization parameter of an encoder, and determining a sum of increase ratios of code rates of the object regions of the human body category; and determining, in response to the sum of the increase ratios exceeding a preset increase ratio threshold of the target video frame, that each object region of the text type in the target video frame is the non-ROI.

In these alternative implementations, the executing body may acquire the quantization parameter change corresponding to each object region of the human body category in the target video frame when the target video frame includes both the object region of the human body category and the object region of the text type. In practice, the quantization parameter change may be determined from the preset constant and the constant coefficient. For example, the quantization parameter change may be a product of the preset constant and the constant coefficient, or an addition of the preset constant and the constant coefficient, and so on. Here, on the basis that the preset constant is known, the target quantization parameter change may be determined based on the specified constant coefficient.

Based on the quantization parameter change and the ratio of the region to the video frame, the increase ratio of the code rate after encoding may be determined. Therefore, the executing body may predict, for each object region of the human body category in the target video frame, based on the quantization parameter change corresponding to the object region and the ratio of the object region to the target video frame, the increase ratio of the code rate after encoding of the object region. If the target quantization parameter change is not introduced, the encoder may use the specified quantization parameter for encoding.

For example, the specified quantization parameter that the encoder encodes for a ROI is X, and a specified code rate obtained by encoding is 600 kbps. In order to improve the picture quality of the ROI, the executing body sets a new quantization parameter as Y, where Y<X. The code rate of the ROI obtained by encoding using the quantization parameter Y is 900 kbps, then the obtained increase ratio of code rate is 0.5.

In this way, the executing body may determine the increase ratio of the code rate of each object region of the human body category, and may determine the sum of these increase ratios. Then, the executing body may compare the sum of the increase ratios with the preset increase ratio threshold. If the sum of the increase ratios exceeds the threshold, the executing body may determine that each object region of the text type in the target video frame is the non-ROI.

In these implementations, when the increase ratio of the code rate of the object region of the human body category is relatively large, in order to ensure that the overall code rate of the target video frame after encoding is relatively low, the object region of the text type may be used as the non-ROI.

Figure 3:
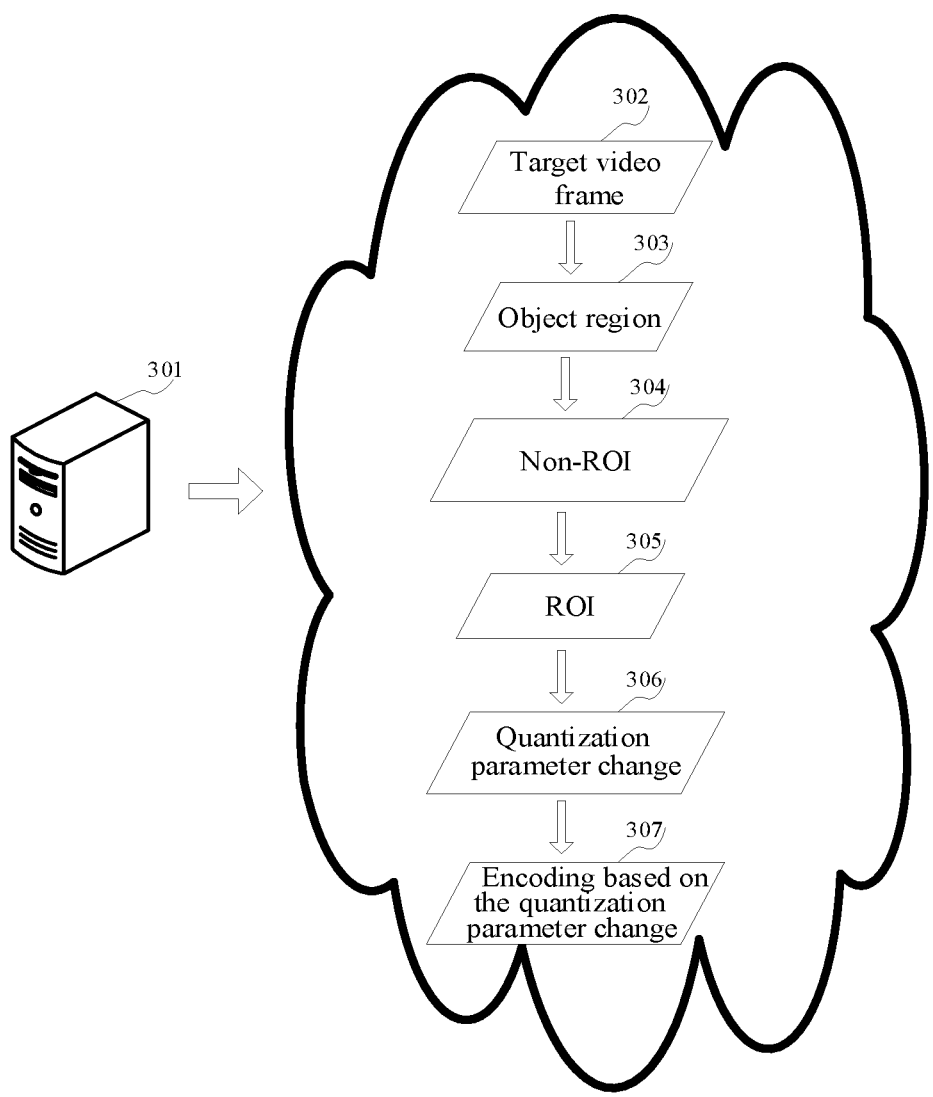
FIG. 3 is a schematic diagram of an application scenario of the method for processing a video according to the present disclosure.

With further reference to FIG. 3, FIG. 3 is a schematic diagram of an application scenario of the method for processing a video according to the present embodiment. In the application scenario of FIG. 3, an executing body 301 may acquire object regions 303 obtained by performing object detection on a target video frame 302, including an object region including the head, an object region including the body and an object region including text, where the type of the object in each object region is a preset type. For an object region in the acquired object regions, in response to determining that the object region satisfies a preset condition, it is determined that the object region is a non-ROI 304. For example, the object region including the body is a non-ROI. In the object regions of the target video frame, object regions other than the non-ROI are used as ROIs 305, including the object region including the head and the object region including the text. Quantization parameter change 306 corresponding to each ROI is acquired, and the target video frame is encoded 307 based on the quantization parameter change.

Figure 4:
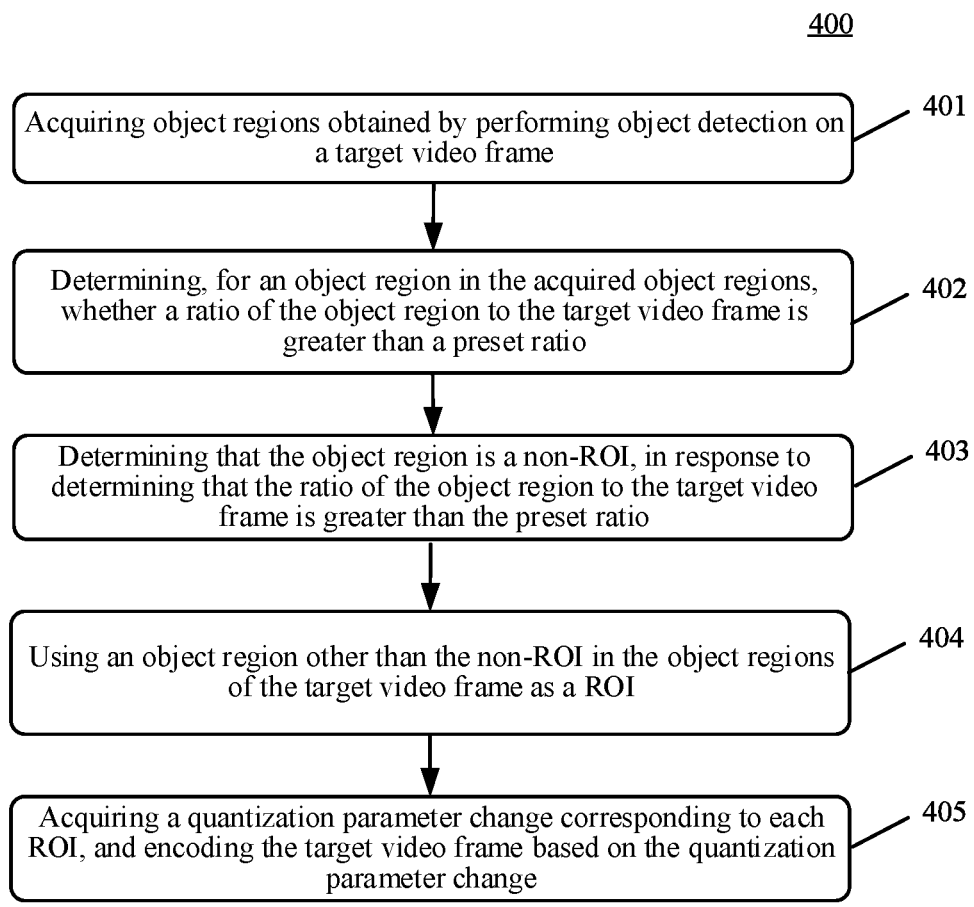
FIG. 4 is a flowchart of the method for processing a video according to another embodiment of the present disclosure.

With further reference to FIG. 4, a flow 400 of another embodiment of the method for processing a video is illustrated. The flow 400 of the method for processing a video includes the following steps.

Step 401, acquiring object regions obtained by performing object detection on a target video frame, a type of an object in each of the object regions being a preset type.

In the present embodiment, an executing body of the method for processing a video (for example, the server or the terminal device shown in FIG. 1) may acquire the object regions obtained by performing object detection on the target video frame. Specifically, the obtained object region may refer to the position of the object region in the target video frame, or may refer to a region image matrix where the object region is located in the target video frame.

Step 402, determining, for an object region in the acquired object regions, whether a ratio of the object region to the target video frame is greater than a preset ratio.

In the present embodiment, the executing body may determine, for the object region in the acquired object region, for example, each object region, the ratio of the object region to the target video frame, and determine whether the ratio is greater than the preset ratio. Specifically, the ratio of the object region to the target video frame may be the ratio of the area of the object region to the area of the target video frame. For example, the preset ratio is 70%. The ratio of the object region to the target video frame is 80%, then the ratio is greater than the preset ratio.

Step 403, determining that the object region is a non-ROI, in response to determining that the ratio of the object region to the target video frame is greater than the preset ratio.

In the present embodiment, if the result of the determination of the executing body is that the ratio of the object region to the target video frame is greater than the preset ratio, it may be determined that the object region is the non-ROI. In this way, the area of the object region determined as the ROI in the target video frame may not be too large.

In the present embodiment, when the area of the object region is too large, the object region may not be determined as the ROI, to avoid encoding the ROI to cause the code rate of the video frame to be too large, and further avoid the problem of causing a video file to be too large.

In some alternative implementations of the present embodiment, step 403 may include: determining, in response to determining that the ratio of the object region to the target video frame is greater than the preset ratio and the type of the object in the object region is a preset type with highest priority, that each object region in the target video frame is the non-ROI, the priority being used to represent a priority for determining each type of object region as the ROI.

In these alternative implementations, in the case that the ratio of the object region to the target video frame is greater than the preset ratio, and if the object in the object region is determined to be the preset type with the highest priority, then the executing body may determine each object region in the target video frame to be the non-ROI, that is, there is no ROI in the target video frame.

Object regions of different preset types have different priorities. For example, for the object region of the head type, the object region of the body type and the object region of the text type, the object region of the head type may have the highest priority and the object region of the text type may have the lowest priority. In practice, if the object region with a very large ratio is the head region, then the executing body may determine that all object regions in the video frame are non-ROIs.

These implementations may avoid that the definition of non-focus regions is too high in a video frame being played, which may cause a waste of computing resources while not being able to highlight key points.

Step 404, using an object region other than the non-ROI in the object regions of the target video frame as a ROI.

In the present embodiment, after determining the non-ROI, the executing body may directly determine the object region other than the non-ROI in the acquired object regions as the ROI.

Step 405, acquiring a quantization parameter change corresponding to each ROI, and encoding the target video frame based on the quantization parameter change.

In the present embodiment, the executing body may acquire the quantization parameter change corresponding to each ROI. Then, the executing body may use the acquired quantization parameter change to encode. The executing body may directly acquire the quantization parameter change of the object in each ROI locally or from another electronic device, or may determine the quantization parameter change locally.

Figure 5:
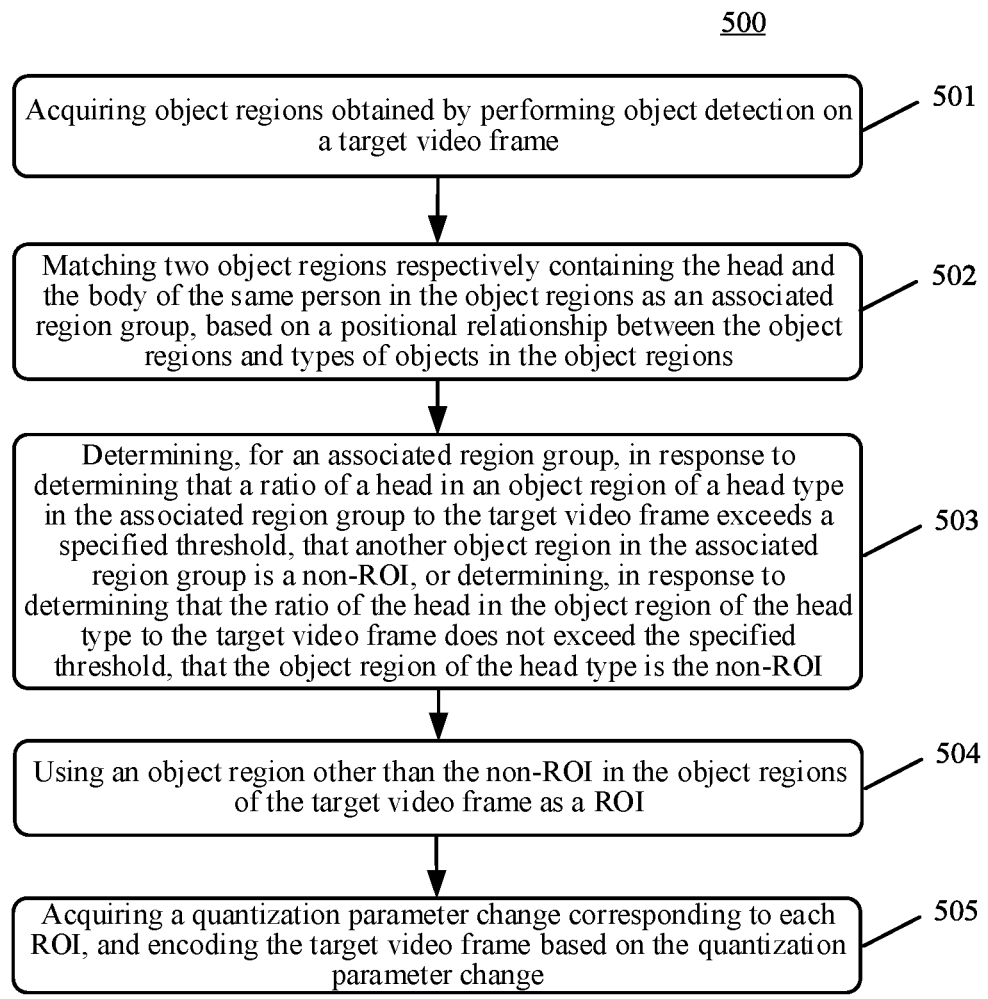
FIG. 5 is a flowchart of the method for processing a video according to another embodiment of the present disclosure.

With further reference to FIG. 5, a flow 500 of another embodiment of the method for processing a video is illustrated. The flow 500 of the method for processing a video includes the following steps.

Step 501, acquiring object regions obtained by performing object detection on a target video frame, a type of an object in each of the object regions being a preset type.

In the present embodiment, an executing body of the method for processing a video (for example, the server or the terminal device shown in FIG. 1) may acquire the object regions obtained by performing object detection on the target video frame. Specifically, the obtained object region may refer to the position of the object region in the target video frame, or may refer to a region image matrix where the object region is located in the target video frame.

Step 502, matching two object regions respectively containing the head and the body of the same person in the object regions as an associated region group, based on a positional relationship between the object regions and types of objects in the object regions.

In the present embodiment, for object regions in the acquired object regions, the executing body may match the associated region group including object regions respectively containing the head and the body of the same person, based on the positional relationship between the object regions and the preset types of the objects in the object regions. Each associated region group consists of two object regions, one of the two object regions includes a person's head, and the other of the two object regions includes the person's body.

Step 503, determining, for an associated region group, in response to determining that a ratio of a head in an object region of a head type in the associated region group to the target video frame exceeds a specified threshold, that another object region in the associated region group is a non-ROI, or determining, in response to determining that the ratio of the head in the object region of the head type to the target video frame does not exceed the specified threshold, that the object region of the head type is the non-ROI.

In the present embodiment, specifically, the object region including the head is an object region of the head type, the object region including the body is an object region of the body type, and the object region including text is an object region of the text type. For any matched associated region group, in response to determining that the head in the object region of the head type in the associated region group accounts for a large ratio of the target video frame, the executing body may determine that the other object region in the associated region group is the non-ROI. If the ratio of the head in the object region of the head type is small, then the object region of the head type is determined as the non-ROI. The specified threshold here may be smaller than the above preset ratio.

Step 504, using an object region other than the non-ROI in the object regions of the target video frame as a ROI.

In the present embodiment, after determining the non-ROI, the executing body may directly determine the object region other than the non-ROI in the acquired object regions as the ROI.

Step 505, acquiring a quantization parameter change corresponding to each ROI, and encoding the target video frame based on the quantization parameter change.

In the present embodiment, the executing body may acquire the quantization parameter change corresponding to each ROI. Then, the executing body may use the acquired quantization parameter change to encode. The executing body may directly acquire the quantization parameter change of the object in each ROI locally or from another electronic device, or may determine the quantization parameter change locally.

In the present embodiment, when the head in the object region of the head type is large, the object region may be determined as the ROI, so that a non-focus region in the video frame that is too small is not processed, to avoid waste of calculation and storage resources.

Figure 6:
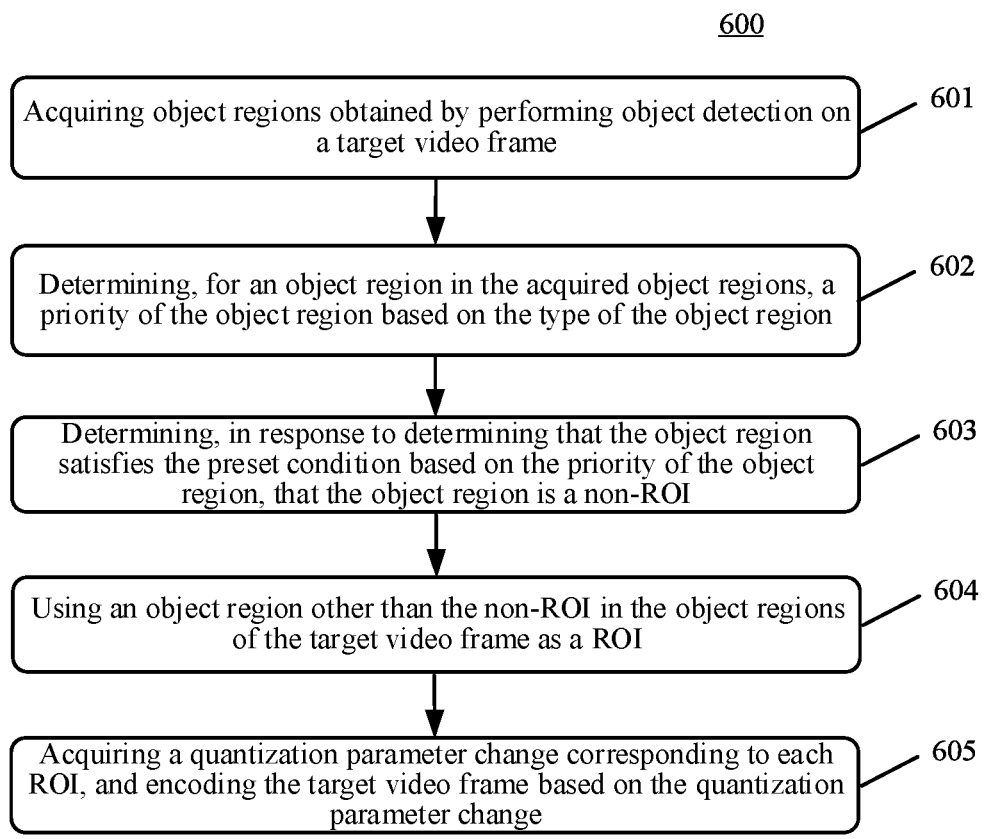
FIG. 6 is a flowchart of the method for processing a video according to another embodiment of the present disclosure.

With further reference to FIG. 6, a flow 600 of another embodiment of the method for processing a video is illustrated. The flow 600 of the method for processing a video includes the following steps.

Step 601, acquiring object regions obtained by performing object detection on a target video frame, a type of an object in each of the object regions being a preset type.

In the present embodiment, an executing body of the method for processing a video (for example, the server or the terminal device shown in FIG. 1) may acquire the object regions obtained by performing object detection on the target video frame. Specifically, the obtained object region may refer to the position of the object region in the target video frame, or may refer to a region image matrix where the object region is located in the target video frame.

Step 602, determining, for an object region in the acquired object regions, a priority of the object region based on the type of the object region.

In the present embodiment, object regions of different preset types have different priorities. Therefore, the executing body may directly determine the priority of the object region based on the type of the object region.

Step 603, determining, in response to determining that the object region satisfies the preset condition based on the priority of the object region, that the object region is a non-ROI.

In the present embodiment, if the executing body determines that the object region satisfies the preset condition based on the priority of the object region, the object region may be determined as the non-ROI. Specifically, the executing body may use various methods to determine that the object region satisfies the preset condition based on the priority of the object region. For example, the executing body may sort the object regions according to priorities, and determine half of all object regions according to lower priorities in the priority sequence. Then, the executing body may randomly select N object regions from the half of the object regions as the ROIs.

In some alternative implementations of the present embodiment, step 603 may include: selecting, from the object regions, a preset number of object regions according to the priorities of the object regions in a descending order; and using an object region other than the selected object regions as the non-ROI, in response to determining that ratios of the selected object regions in the object regions to the target video frame do not exceed a preset ratio.

In these alternative implementations, the executing body may select according to the priorities of the object regions in the descending order, as long as the total area of the selected object regions is not too large, and the area of the selected object regions may be used as the ROI.

These implementations may accurately determine the non-ROI based on the priorities and ratios of the object regions, and at the same time, avoid the problem of excessively large video file after encoding the target video frame.

Step 604, using an object region other than the non-ROI in the object regions of the target video frame as a ROI.

In the present embodiment, after determining the non-ROI, the executing body may directly determine the object region other than the non-ROI in the acquired object regions as the ROI.

Step 605, acquiring a quantization parameter change corresponding to each ROI, and encoding the target video frame based on the quantization parameter change.

In the present embodiment, the executing body may acquire the quantization parameter change corresponding to each ROI. Then, the executing body may use the acquired quantization parameter change to encode. The executing body may directly acquire the quantization parameter change of the object in each ROI locally or from another electronic device, or may determine the quantization parameter change locally.

In the present embodiment, the priority of the ROI may be used to determine whether an object region satisfies the preset condition, so that the final result of determining the ROI is more accurate.

Figure 7:
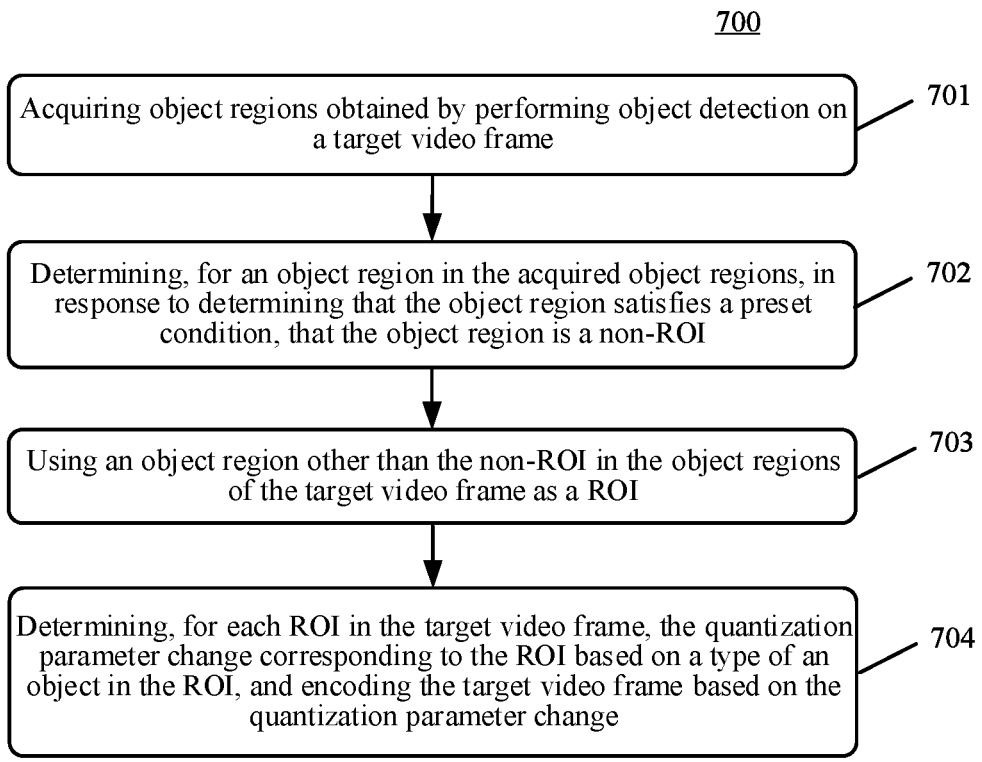
FIG. 7 is a flowchart of the method for processing a video according to another embodiment of the present disclosure.

With further reference to FIG. 7, a flow 700 of the method for processing a video according to an embodiment of the present disclosure is illustrated. The method for processing a video includes the following steps.

Step 701, acquiring object regions obtained by performing object detection on a target video frame, a type of an object in each of the object regions being a preset type.

In the present embodiment, an executing body of the method for processing a video (for example, the server or the terminal device shown in FIG. 1) may acquire the object regions obtained by performing object detection on the target video frame. Specifically, the obtained object region may refer to the position of the object region in the target video frame, or may refer to a region image matrix where the object region is located in the target video frame.

Step 702, determining, for an object region in the acquired object regions, in response to determining that the object region satisfies a preset condition, that the object region is a non-ROI.

In the present embodiment, the executing body may determine, for the object region (such as each object region) in the acquired object region, whether the object region is the non-ROI. The non-ROI may refer to an object region that is not a ROI.

In practice, the preset condition may be various conditions. For example, the preset condition may be that the object in the object region is an object of a first preset type. For example, the brightness of pixels in the object region is less than a preset threshold.

Step 703, using an object region other than the non-ROI in the object regions of the target video frame as a ROI.

In the present embodiment, after determining the non-ROI, the executing body may directly determine the object region other than the non-ROI in the acquired object regions as the ROI.

Step 704, determining, for each ROI in the target video frame, the quantization parameter change corresponding to the ROI based on a type of an object in the ROI, and encoding the target video frame based on the quantization parameter change, the type of the object being one of at least one preset type.

In the present embodiment, the executing body may determine the corresponding quantization parameter change for each ROI based on the type of the object in the ROI. In practice, the executing body may determine the quantization parameter change corresponding to the ROI based on the type of the object in the ROI using various methods. For example, the executing body may acquire a corresponding relationship between the preset type and the quantization parameter change. In this way, after determining the type of the object region, the executing body may determine the quantization parameter change corresponding to the type (that is, the preset type).

In the present embodiment, the quantization parameter change of the ROI may be determined based on the preset type, so that the speed and accuracy of the determination can be improved.

In some alternative implementations of the present embodiment, step 704 may include: acquiring a maximum value of a sum of increase ratios of code rates of types of ROIs in the target video frame, where the maximum value of the sum of the increase ratios of the code rates is obtained relative to code rates of types of ROIs obtained by encoding the types of ROIs based on a specified quantization parameter of an encoder; acquiring a preset constant corresponding to the type of the object in the ROI, where different preset types correspond to different preset constants, and the quantization parameter change is determined based on the preset constant and a constant coefficient; and determining the quantization parameter change corresponding to each type of ROI in the target video frame based on the maximum value of the sum of the increase ratios of the code rates, the preset constant corresponding to each type of ROI, and the ratio of each type of ROI to the target video frame.

In these alternative implementations, the preset constants corresponding to different preset types may be different. For example, the preset constant corresponding to the head type may be 5, and the preset constant corresponding to the body type may be 3. The constant coefficient of the preset constants is the same. For the sum of the increase ratios of all the ROIs of the target video frame, a maximum value may be set. If the sum of the increase ratios of the code rates, the ratio of each type of ROI to the target video frame, and the preset constant corresponding to each type of ROI are obtained, the constant coefficient may be determined. Furthermore, the quantization parameter change of the ROI may be obtained based on the constant coefficient and the preset constant of the ROI. The non-ROI is encoded using the specified quantization parameter of the encoder, so there is no quantization parameter change and increase in the code rate for the non-ROI.

In practice, the relationship between the increase ratio of the code rate and the ratio of a type of ROI to the target video frame and the quantization parameter change of the type of ROI may be expressed as:

$$I_i = F(S_i, \Delta Q_i)$$

Here, $\Delta Q_i$ is the quantization parameter change of the $i^{th}$ type of ROI (relative to the quantization parameter specified by the encoder), $S_i$ is the ratio of the $i^{th}$ type of ROI to the target video frame, and $I_i$ is the increase ratio of the code rate of the $i^{th}$ type of ROI (relative to the code rate encoded based on the quantization parameter specified in the encoder).

In practice, the relationship between the sum I of the increase ratios of the code rates of all the ROIs in the target video frame, the ratio $S_i$ of each ROI to the target video frame and the quantization parameter change $\Delta Q_i$ of each ROI may be expressed as:

$$I = \sum_{i=1}^{m} F(S_i, \Delta Q_i)$$

In the ROIs, $\Delta Q_i$ of ROIs of different types are different, and $\Delta Q_i$ of ROIs of the same type are the same. Here, m refers to that the target video frame has m different types of ROIs.

Suppose $\Delta Q_i = k \Delta q_i$, here $\Delta q_i$ is the preset constant of the $i^{th}$ type of ROI, k is the constant coefficient. For settings of the target video frame, $I_m$ is the maximum value of the sum of the increase ratios of the code rates of all types of ROIs, $S_i$ is the ratio of the $i^{th}$ type of ROI to the target video frame, and $\Delta q_i$ is the preset constant of the $i^{th}$ type of ROI. The executing body may determine the maximum value of k from the contents of these settings. Specifically, the maximum value k may be determined according to the following formula:

$$\max\{k\} \text{ s.t. } \sum_{i=1}^{m} F(S_i, k \Delta q_i) \le I_m, k \le 1$$

In this way, k may be determined, and then $\Delta Q_i$ of each type of ROI may be further determined.

These implementations may set different preset constants for different types of ROIs, so that different types of ROIs can be differently encoded during the encoding process. In addition, the maximum value of the increase ratios of the code rates of the target video frame may also be set to ensure that the video file is not too large.

In some alternative implementations of the above embodiments, the acquiring object regions obtained by performing object detection on a target video frame, may include: acquiring a video frame sequence of a video; determining a previous frame in the video frame sequence, and determining a subsequent frame, in the video frame sequence, corresponding to the determined previous frame, based on the acquired number of frames elapsed from the previous frame to the subsequent frame; performing following update steps: acquiring object regions detected separately in the determined previous frame and the subsequent frame, and a confidence of each of the object regions; determining, from the determined object region of the previous frame and the determined object region of the subsequent frame, a first object region and a second object region including a same object; and fusing a confidence of the first object region and a confidence of the second object region, and updating the confidence of the second object region based on a result of the fusion; the method further includes: determining, from object regions with updated confidences in the determined subsequent frame, an object region having a confidence less than a confidence threshold; and determining the object region having the confidence less than the confidence threshold as a non-object region.

In these alternative implementations, the target video frame may be a video frame in the video frame sequence. The executing body may determine the previous frame in the acquired video frame sequence, and then determine the subsequent frame. The previous frame may be the first frame of the video frame sequence, or may be any frame preset in the video frame sequence. Specifically, the executing body may determine the subsequent frame based on the acquired number of frames elapsed from the previous frame to the subsequent frame using various methods. For example, the number of frames elapsed from the previous frame to the subsequent frame is 5, if the determined previous frame is the first frame, then the fifth bit from the first frame of the video frame sequence is the fifth frame. Therefore, the subsequent frame is the fifth frame. In practice, the update step may be executed a plurality of times in a loop, and the number of frames elapsed from the previous frame to the subsequent frame in different times may be different.

The executing body may acquire the object region detected in the determined previous frame and the confidence of the object region. In addition, the executing body may also acquire the object region detected in the determined subsequent frame and the confidence of the object region. Specifically, the obtained object region may refer to the position of the object region in the target video frame, or may refer to a region image matrix where the object region is located in the target video frame.

The executing body may determine the first object region from the determined previous frame, and determine the second object region from the determined subsequent frame. Here, the first object region and the second object region include the same object. For example, if a position in the previous frame contains Zhang San's face, and a similar position in the subsequent frame also contains Zhang San's face, then, the region where Zhang San's face is located in the previous frame and the region where Zhang San's face is located in the subsequent frame are the first object region and the second object region, respectively. In practice, the executing body may use the first object region and the second object region as a set of matched object regions. The executing body may detect one or more sets of matched object regions from the previous frame and the subsequent frame.

The executing body may fuse the confidence of the first object region and the confidence of the second object region. Then, the executing body may update the confidence of the second object region based on the result of the fusion.

In practice, the executing body may perform fusing using various methods. For example, the executing body may set weights to the confidence of the first object region and the confidence of the second object region. For example, the executing body may set the weight of the confidence $P_2$ of the second object region as $\lambda$ and set the weight of the confidence $P_1$ of the first object region as $1-\lambda$, then the confidence $P_2'$ of the second object region obtained by fusion may be expressed as: $P_2'=\lambda P_2+(1-\lambda) P_1$. In addition, the executing body may also input the confidence of the first object region and the confidence of the second object region into a preset confidence fusion model, and obtain a fusion result from the confidence fusion model. Specifically, the confidence fusion model here may be a corresponding relationship table representing the corresponding relationship between the confidence of the first object region, the confidence of the second object region, and the confidence obtained by the fusion, and may also be a formula or a deep neural network representing the corresponding relationship.

The executing body may use the currently determined subsequent frame to update the determined previous frame. Specifically, the executing body may directly use the subsequent frame that has not been updated this time as the updated previous frame.

These implementations may avoid the situation where the confidence detected for the same object in different video frames has great a difference, so as to avoid affecting a subsequent operation based on the confidence. For example, the operation here may be an operation of adjusting the picture quality only for the object region with high confidence. If the confidence difference between different video frames is large, the definition difference of the same object in the different video frames may be large. Therefore, these implementations may ensure that the picture quality in a played video is relatively uniform.

In some alternative application scenarios of these implementations, the above update steps may further include: updating the determined previous frame and the subsequent frame, where the updated previous frame is the subsequent frame before the update; and the method further includes: performing the update steps again, in response to determining that the subsequent frame before the update is not the last frame in the video frame sequence.

These application scenarios may perform the update steps a plurality of times to comprehensively process the video frame sequence, so that the confidences of the object regions are more uniform, and at the same time more accurate object regions can be obtained.

Figure 8:
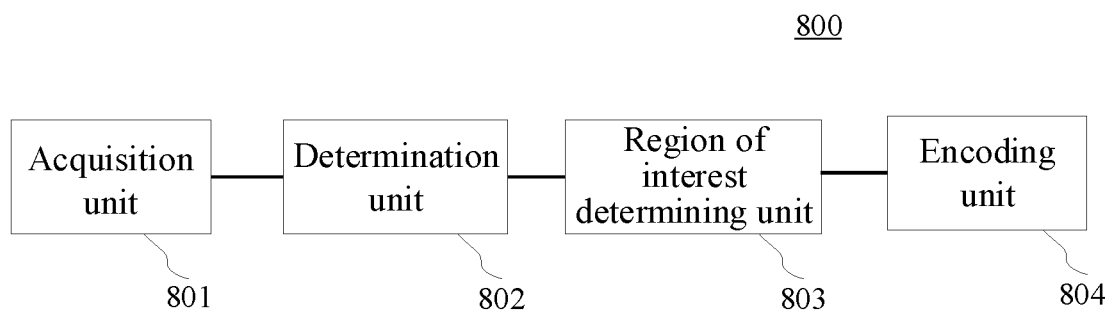
FIG. 8 is a schematic structural diagram of an apparatus for processing a video according to an embodiment of the present disclosure.

With further reference to FIG. 8, as an implementation of the method shown in the above figures, an embodiment of the present disclosure provides an apparatus for processing a video, and the apparatus embodiment corresponds to the method embodiment as shown in FIG. 2. In addition to the features described below, the apparatus embodiment may also include the same or corresponding features or effects as the method embodiment shown in FIG. 2. The apparatus may be specifically applied to various electronic devices.

As shown in FIG. 8, an apparatus 800 for processing a video of the present embodiment includes: an acquisition unit 801, a determination unit 802, a region of interest determining unit 803 and an encoding unit 804. The acquisition unit 801 is configured to acquire object regions obtained by performing object detection on a target video frame, a type of an object in each of the object regions being a preset type. The determination unit 802 is configured to determine, for an object region in the acquired object regions, in response to determining that the object region satisfies a preset condition, that the object region is a non-ROI. The region of interest determining unit 803 is configured to use an object region other than the non-ROI in the object regions of the target video frame as a ROI. The encoding unit 804 is configured to acquire a quantization parameter change corresponding to each ROI, and encode the target video frame based on the quantization parameter change.

In some embodiments, the acquisition unit 801 of the apparatus 800 for processing a video may acquire the object regions obtained by performing object detection on the target video frame. Specifically, the obtained object region may refer to the position of the object region in the target video frame, or may refer to a region image matrix where the object region is located in the target video frame.

In some embodiments, the determination unit 802 may determine, for the object region (such as each object region) in the acquired object region, whether the object region is a non-ROI. The non-ROI may refer to an object region that is not a ROI.

In some embodiments, after determining the non-ROI, the region of interest determining unit 803 may directly determine the object region other than the non-ROI in the acquired object regions as the ROI.

In the present embodiment, the encoding unit 804 may acquire the quantization parameter change corresponding to each ROI. Then, the executing body may use the acquired quantization parameter change to encode. The executing body may directly acquire the quantization parameter change of the object in each ROI locally or from another electronic device, or may determine the quantization parameter change locally.

In some alternative implementations of the present embodiment, the encoding unit is further configured to acquire the quantization parameter change corresponding to each ROI by: determining, for each ROI in the target video frame, the quantization parameter change corresponding to the ROI based on a type of an object in the ROI, the type of the object being one of at least one preset type.

In some alternative implementations of the present embodiment, the determination unit is further configured to determine, for the object region in the acquired object regions, in response to determining that the object region satisfies the preset condition, that the object region the a non-ROI by: determining, for the object region in the acquired object regions, whether a ratio of the object region to the target video frame is greater than a preset ratio; and determining that the object region is the non-ROI in response to determining that the ratio of the object region to the target video frame is greater than the preset ratio.

In some alternative implementations of the present embodiment, the determination unit is further configured to determine that the object region is the non-ROI in response to determining that the ratio of the object region to the target video frame is greater than the preset ratio by: determining, in response to determining that the ratio of the object region to the target video frame is greater than the preset ratio and the type of the object in the object region is a preset type with a highest priority, that the object regions in the target video frame are non-ROIs, the priority being used to represent a priority for determining each type of object region as the ROI.

In some alternative implementations of the present embodiment, for object regions of a same type, an object region having larger area has a higher priority, and the priority is used to represent a priority for determining each type of object region as the ROI.

In some alternative implementations of the present embodiment, for object regions respectively containing a head and a body of a same person, in response to determining that the ratio of the object region containing the head to the target video frame is greater than a specified threshold, the object region containing the head has a priority higher than a priority of the object region containing the body, or in response to determining that the ratio of the object region containing the head to the target video frame is not greater than the specified threshold, the object region containing the body has a priority higher than a priority of the object region containing the head, both types of the head and the body are preset types.

In some alternative implementations of the present embodiment, the determination unit is further configured to determine, for the object region in the acquired object regions, in response to determining that the object region satisfies the preset condition, that the object region is the non-ROI by: matching two object regions respectively containing a head and a body of a same person in the object regions as an associated region group, based on a positional relationship between the object regions and types of objects in the object regions; and determining, for an associated region group, in response to determining that a ratio of a head in an object region of a head type in the associated region group to the target video frame exceeds a specified threshold, that another object region of the associated region group is the non-ROI, or in response to determining that the ratio of the head in the object region of the head type to the target video frame does not exceed the specified threshold, that the object region of the head type is the non-ROI.

In some alternative implementations of the present embodiment, the determination unit is further configured to determine, for the object region in the acquired object regions, in response to determining that the object region satisfies the preset condition, that the object region is the non-ROI by: determining, for the object region in the acquired object regions, a priority of the object region based on the type of the object region; and determining, in response to determining that the object region satisfies the preset condition based on the priority of the object region, that the object region is the non-ROI.

In some alternative implementations of the present embodiment, the determination unit is further configured to determine, in response to determining that the object region satisfies the preset condition based on the priority of the object region, that the object region is the non-ROI by: selecting, for the object regions, a preset number of object regions according to priorities of the object regions in a descending order; and using an object region other than the selected object regions as the non-ROI, in response to determining that ratios of the selected object regions in the object regions to the target video frame do not exceed a preset ratio.

In some alternative implementations of the present embodiment, both a head type and a body type belong to a human body category; and the determination unit is further configured to determine, for the object region in the acquired object regions, in response to determining that the object region satisfies the preset condition, that the object region is the non-ROI by: acquiring, in response to the target video frame containing an object region of the human body category and an object region of a text type, a target quantization parameter change corresponding to each object region of the human body category in the target video frame, where the target quantization parameter change is determined based on a preset constant and a specified constant coefficient, and different preset types correspond to different preset constants; predicting, for each object region of the human body category in the target video frame, based on the target quantization parameter change corresponding to the object region and a ratio of the object region to the target video frame, an increase ratio of the object region relative to an object region obtained by encoding based on a specified quantization parameter of an encoder, and determining a sum of increase ratios of code rates of the object regions of the human body category; and determining, in response to the sum of the increase ratios exceeding a preset increase ratio threshold of the target video frame, that each object region of the text type in the target video frame is the non-ROI.

In some alternative implementations of the present embodiment, the encoding unit is further configured to determine, for each ROI in the target video frame, the quantization parameter change corresponding to the ROI based on the type of the object in the ROI by: acquiring a maximum value of a sum of increase ratios of code rates of types of ROIs in the target video frame, where the maximum value of the sum of the increase ratios of the code rates is obtained relative to types of ROIs obtained by encoding based on a specified quantization parameter of an encoder; acquiring a preset constant corresponding to the type of the object in the ROI, where different preset types correspond to different preset constants, and the quantization parameter change is determined based on a preset constant and a constant coefficient; and determining quantization parameter change corresponding to each type of ROI in the target video frame based on the maximum value of the sum of the increase ratios of the code rates, the preset constant corresponding to each type of ROI, and the ratio of each type of ROI to the target video frame.

In some alternative implementations of the present embodiment, the acquisition unit is further configured to acquire object regions obtained by performing object detection on the target video frame by: acquiring a video frame sequence of a video; determining a previous frame in the video frame sequence, and determining a subsequent frame, in the video frame sequence, corresponding to the determined previous frame, based on acquired number of frames elapsed from the previous frame to the subsequent frame; performing the following update steps: acquiring object regions detected separately in the determined previous frame and the subsequent frame, and a confidence of each of the object regions; determining, from the determined object region of the previous frame and the determined object region of the subsequent frame, a first object region and a second object region including a same object; fusing a confidence of the first object region and a confidence of the second object region, and updating the confidence of the second object region based on a result of the fusion; determining, from object regions with updated confidences in the determined subsequent frame, an object region having a confidence less than a confidence threshold; and determining the object region having the confidence less than the confidence threshold as a non-object region.

In some alternative implementations of the present embodiment, the update steps further include: updating the determined previous frame and the subsequent frame, where the updated previous frame is the subsequent frame before the update; and the apparatus further includes: an update unit, configured to perform the update steps again, in response to determining that the subsequent frame before the update is not the last frame in the video frame sequence.

Figure 9:
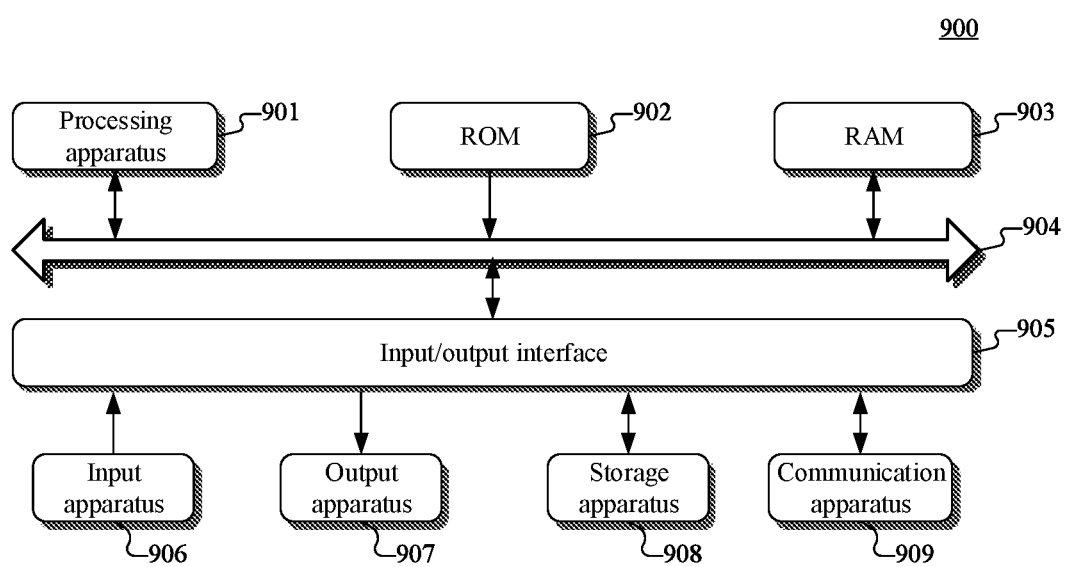
FIG. 9 is a schematic structural diagram of an electronic device adapted to implement some embodiments of the present disclosure.

As shown in FIG. 9, the electronic device 900 may include a processing apparatus (for example, a central processor, a graphics processor, etc.) 901, which may execute various appropriate actions and processes in accordance with a program stored in a read-only memory (ROM) 902 or a program loaded into a random access memory (RAM) 903 from a storage apparatus 908. The RAM 903 also stores various programs and data required by operations of the electronic device 900. The processing apparatus 901, the ROM 902 and the RAM 903 are connected to each other through a bus 904. An input/output (I/O) interface 905 is also connected to the bus 904.

Generally, the following apparatuses may be connected to the I/O interface 905: an input apparatus 906, including such as a touch screen, a touch pad, a keyboard, a mouse, a camera, a microphone, an accelerometer, or a gyroscope; an output apparatus 907 including such as a liquid crystal display (LCD), a speaker, or a vibrator; the storage apparatus 908 including such as a magnetic tape, or a hard disk; and a communication apparatus 909. The communication apparatus 909 may allow the electronic device 900 to perform wireless or wired communication with other devices to exchange data. Although FIG. 9 shows the electronic device 900 having various apparatuses, it should be understood that it is not required to implement or have all the apparatuses shown. More or fewer apparatuses may be implemented or provided instead. Each block shown in FIG. 9 may represent one apparatus, and may also represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 909, or may be installed from the storage apparatus 908, or installed from the ROM 902. The computer program, when executed by the processing apparatus 901, implements the above mentioned functionalities as defined in the method of embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor, for example, may be described as: a processor including an acquisition unit, a determination unit, a region of interest determining unit and an encoding unit. Here, the names of these units do not in some cases constitute limitations to such units themselves. For example, the region of interest determining unit may also be described as "a unit configured to use an object region other than the non-ROI in the object regions of the target video frame as a ROI".

In another aspect, the present disclosure further provides a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: acquire object regions obtained by performing object detection on a target video frame, a type of an object in each of the object regions being a preset type; determine, for an object region in the acquired object regions, in response to determining that the object region satisfies a preset condition, that the object region is a non-ROI; use an object region other than the non-ROI in the object regions of the target video frame as a ROI; and acquire a quantization parameter change corresponding to each ROI, and encode the target video frame based on the quantization parameter change.

The above description only provides an explanation of embodiments of the present disclosure and the technical principles used. It should be appreciated by those skilled in the art that the inventive scope of the present disclosure is not limited to the technical solutions formed by the particular combinations of the above-described technical features.

The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for processing a video, the method comprising:
acquiring object regions obtained by performing object detection on a target video frame, a type of an object in each of the object regions being a preset type;
determining, for an object region in the acquired object regions, in response to determining that the object region satisfies a preset condition, that the object region is a non-ROI (region of interest);
using object regions other than the non-ROI in the object regions of the target video frame as ROIs; and
acquiring a quantization parameter change corresponding to each of the ROIs, and encoding the target video frame based on the quantization parameter change corresponding to each of the ROIs;
wherein acquiring the quantization parameter change corresponding to each of the ROIs, comprises:
determining, for each of the ROIs in the target video frame, the quantization parameter change corresponding to each of the ROIs based on the type of the object in each of the ROIs, the type of the object in each of the ROIs being one of at least one preset type, by:
acquiring a maximum value of a sum of increase ratios of code rates of types of ROIs in the target video frame, wherein the maximum value of the sum of the increase ratios of the code rates is obtained relative to types of ROIs obtained by encoding based on a specified quantization parameter of an encoder;
acquiring a preset constant corresponding to the type of the object in each of the ROIs, wherein different preset types correspond to different preset constants, and the quantization parameter change is determined based on the preset constant and a constant coefficient; and
determining a quantization parameter change corresponding to each type of ROI in the target video frame based on the maximum value of the sum of the increase ratios of the code rates, the preset constant corresponding to each type of ROI, and a ratio of each type of ROI to the target video frame.

2. The method according to claim 1, wherein the determining, for the object region in the acquired object regions, in response to determining that the object region satisfies the preset condition, that the object region is the non-ROI, comprises:
determining, for the object region in the acquired object regions, whether a ratio of the object region to the target video frame is greater than a preset ratio; and
determining that the object region is the non-ROI in response to determining that the ratio of the object region to the target video frame is greater than the preset ratio.

3. The method according to claim 2, wherein the determining that the object region is the non-ROI in response to determining that the ratio of the object region to the target video frame is greater than the preset ratio, comprises:
determining, in response to determining that the ratio of the object region to the target video frame is greater than the preset ratio and the type of the object in the object region is a preset type with a highest priority, that the object regions in the target video frame are non-ROIs, a priority being used to represent a priority for determining each type of object region as a ROI.

4. The method according to claim 1, wherein, for object regions of a same type, an object region having a larger area has a higher priority, and a priority is used to represent a priority for determining each type of object region as a ROI.

5. The method according to claim 1, wherein, for object regions respectively containing a head and a body of a same person, in response to determining that a ratio of the object region containing the head to the target video frame is greater than a specified threshold, the object region containing the head has a priority higher than a priority of the object region containing the body, or in response to determining that the ratio of the object region containing the head to the target video frame is not greater than the specified threshold, the object region containing the body has a priority higher than a priority of the object region containing the head, both types of the head and the body are preset types.

6. The method according to claim 1, wherein the determining, for the object region in the acquired object regions, in response to determining that the object region satisfies the preset condition, that the object region is the non-ROI, comprises:
matching two object regions respectively containing a head and a body of a same person in the object regions as an associated region group, based on a positional relationship between the object regions and types of objects in the object regions; and
determining, for a first associated region group, in response to determining that a ratio of a head in an object region of a head type in the first associated region group to the target video frame exceeds a specified threshold, that another object region of the first associated region group is the non-ROI, or in response to determining that the ratio of the head in the object region of the head type to the target video frame does not exceed the specified threshold, that the object region of the head type is the non-ROI.

7. The method according to claim 1, wherein the determining, for the object region in the acquired object regions, in response to determining that the object region satisfies the preset condition, that the object region is the non-ROI, comprises:
determining, for the object region in the acquired object regions, a priority of the object region based on a type of the object region; and
determining, in response to determining that the object region satisfies the preset condition based on the priority of the object region, that the object region is the non-ROI.

8. The method according to claim 7, wherein the determining, in response to determining that the object region satisfies the preset condition based on the priority of the object region, that the object region is the non-ROI, comprises:
selecting, for the object regions, a preset number of the object regions according to priorities of the object regions in a descending order; and
using an object region other than the selected object regions as the non-ROI, in response to determining that ratios of the selected object regions to the target video frame do not exceed a preset ratio.

9. The method according to claim 1, wherein both a head type and a body type belong to a human body category; and the determining, for the object region in the acquired object regions, in response to determining that the object region satisfies the preset condition, that the object region is the non-ROI, comprises:

acquiring, in response to the target video frame containing an object region of the human body category and an object region of a text type, a target quantization parameter change corresponding to each object region of the human body category in the target video frame, wherein the target quantization parameter change is determined based on a preset constant and a specified constant coefficient, and different preset types correspond to different preset constants;

predicting, for each object region of the human body category in the target video frame, based on the target quantization parameter change corresponding to the object region and a ratio of the object region to the target video frame, an increase ratio of the object region relative to an object region obtained by encoding based on a specified quantization parameter of an encoder, and determining a sum of increase ratios of code rates of each object region of the human body category; and determining, in response to the sum of the increase ratios of the code rates of each object region of the human body category exceeding a preset increase ratio threshold of the target video frame, that each object region of the text type in the target video frame is the non-ROI.

10. The method according to claim 1, wherein the acquiring object regions obtained by performing object detection on the target video frame, comprises:

acquiring a video frame sequence of a video;

determining a previous frame in the video frame sequence, and determining a subsequent frame, in the video frame sequence, corresponding to the determined previous frame, based on an acquired number of frames elapsed from the previous frame to the subsequent frame;

performing update steps comprising:

acquiring object regions detected separately in the determined previous frame and the determined subsequent frame, and a confidence of each of the object regions acquired in the determined previous frame and the determined subsequent frame;

determining, from the acquired object regions of the determined previous frame and the acquired object regions of the determined subsequent frame, a first object region and a second object region including a same object; and fusing a confidence of the first object region and a confidence of the second object region, and updating the confidence of the second object region based on a result of the fusion;

and the method further comprises:

determining, from object regions with updated confidences in the determined subsequent frame, an object region having a confidence less than a confidence threshold; and determining the object region having the confidence less than the confidence threshold as a non-object region.

11. The method according to claim 10, wherein the update steps further comprise:

updating the determined previous frame and the subsequent frame, wherein the updated previous frame is the subsequent frame before the update; and the method further comprises:

performing the update steps again, in response to determining that the subsequent frame before the update is not a last frame in the video frame sequence.

12. An apparatus for processing a video, the apparatus comprising:

at least one processor; and a memory storing instructions, the instructions when executed by the at least one processor, causing the at least one processor to perform operations, the operations comprising:

acquiring object regions obtained by performing object detection on a target video frame, a type of an object in each of the object regions being a preset type;

determining, for an object region in the acquired object regions, in response to determining that the object region satisfies a preset condition, that the object region is a non-ROI (region of interest);

using object regions other than the non-ROI in the object regions of the target video frame as ROIs; and acquiring a quantization parameter change corresponding to each of the ROIs, and encoding the target video frame based on the quantization parameter change corresponding to each of the ROIs;

wherein acquiring the quantization parameter change corresponding to each of the ROIs, comprises:

determining, for each of the ROIs in the target video frame, the quantization parameter change corresponding to each of the ROIs based on the type of the object in each of the ROIs, the type of the object in each of the ROIs being one of at least one preset type, by:

acquiring a maximum value of a sum of increase ratios of code rates of types of ROIs in the target video frame, wherein the maximum value of the sum of the increase ratios of the code rates is obtained relative to types of ROIs obtained by encoding based on a specified quantization parameter of an encoder;

acquiring a preset constant corresponding to the type of the object in each of the ROIs, wherein different preset types correspond to different preset constants, and the quantization parameter change is determined based on the preset constant and a constant coefficient; and determining a quantization parameter change corresponding to each type of ROI in the target video frame based on the maximum value of the sum of the increase ratios of the code rates, the preset constant corresponding to each type of ROI, and a ratio of each type of ROI to the target video frame.

13. The apparatus according to claim 12, wherein the determining, for the object region in the acquired object regions, in response to determining that the object region satisfies the preset condition, that the object region is the non-ROI, comprises:

determining, for the object region in the acquired object regions, whether a ratio of the object region to the target video frame is greater than a preset ratio; and determining that the object region is the non-ROI in response to determining that the ratio of the object region to the target video frame is greater than the preset ratio.

14. The apparatus according to claim 13, wherein the determining that the object region is the non-ROI in response to determining that the ratio of the object region to the target video frame is greater than the preset ratio, comprises:

determining, in response to determining that the ratio of the object region to the target video frame is greater than the preset ratio and the type of the object in the object region is a preset type with a highest priority, that the object regions in the target video frame are non-ROIs, a priority being used to represent a priority for determining each type of object region as a ROI.

15. The apparatus according to claim 12, wherein the determining, for the object region in the acquired object regions, in response to determining that the object region satisfies the preset condition, that the object region is the non-ROI, comprises:

matching two object regions respectively containing a head and a body of a same person in the object regions as an associated region group, based on a positional relationship between the object regions and types of objects in the object regions; and determining, for a first associated region group, in response to determining that a ratio of a head in an object region of a head type in the first associated region group to the target video frame exceeds a specified threshold, that another object region of the first associated region group is the non-ROI, or in response to determining that the ratio of the head in the object region of the head type to the target video frame does not exceed the specified threshold, that the object region of the head type is the non-ROI.

16. The apparatus according to claim 12, wherein the determining, for the object region in the acquired object regions, in response to determining that the object region satisfies the preset condition, that the object region is the non-ROI, comprises:

determining, for the object region in the acquired object regions, a priority of the object region based on a type of the object region; and determining, in response to determining that the object region satisfies the preset condition based on the priority of the object region, that the object region is the non-ROI.

17. The apparatus according to claim 16, wherein the determining, in response to determining that the object region satisfies the preset condition based on the priority of the object region, that the object region is the non-ROI, comprises:

selecting, for the object regions, a preset number of the object regions according to priorities of the object regions in a descending order; and using an object region other than the selected object regions as the non-ROI, in response to determining that ratios of the selected object regions to the target video frame do not exceed a preset ratio.

18. The apparatus according to claim 12, wherein, both a head type and a body type belong to a human body category; and the determining, for the object region in the acquired object regions, in response to determining that the object region satisfies the preset condition, that the object region is the non-ROI, comprises:

acquiring, in response to the target video frame containing an object region of the human body category and an object region of a text type, a target quantization parameter change corresponding to each object region of the human body category in the target video frame, wherein the target quantization parameter change is determined based on a preset constant and a specified constant coefficient, and different preset types correspond to different preset constants;

predicting, for each object region of the human body category in the target video frame, based on the target quantization parameter change corresponding to the object region and a ratio of the object region to the target video frame, an increase ratio of the object region relative to an object region obtained by encoding based on a specified quantization parameter of an encoder, and determining a sum of increase ratios of code rates of each object region of the human body category; and determining, in response to the sum of the increase ratios of the code rates of each object region of the human body category exceeding a preset increase ratio threshold of the target video frame, that each object region of the text type in the target video frame is the non-ROI.

19. A non-transitory computer readable storage medium, storing a computer program thereon, the program, when executed by a processor, causing the processor to perform operations, the operations comprising:

acquiring object regions obtained by performing object detection on a target video frame, a type of an object in each of the object regions being a preset type;

determining, for an object region in the acquired object regions, in response to determining that the object region satisfies a preset condition, that the object region is a non-ROI (region of interest);

using object regions other than the non-ROI in the object regions of the target video frame as ROIs; and acquiring a quantization parameter change corresponding to each of the ROIs, and encoding the target video frame based on the quantization parameter change corresponding to each of the ROIs;

wherein acquiring the quantization parameter change corresponding to each of the ROIs, comprises:

determining, for each of the ROIs in the target video frame, the quantization parameter change corresponding to each of the ROIs based on the type of the object in each of the ROIs, the type of the object in each of the ROIs being one of at least one preset type, by:

acquiring a maximum value of a sum of increase ratios of code rates of types of ROIs in the target video frame, wherein the maximum value of the sum of the increase ratios of the code rates is obtained relative to types of ROIs obtained by encoding based on a specified quantization parameter of an encoder;

acquiring a preset constant corresponding to the type of the object in each of the ROIs, wherein different preset types correspond to different preset constants, and the quantization parameter change is determined based on the preset constant and a constant coefficient; and determining a quantization parameter change corresponding to each type of ROI in the target video frame based on the maximum value of the sum of the increase ratios of the code rates, the preset constant corresponding to each type of ROI, and a ratio of each type of ROI to the target video frame.

\* \* \* \* \*